(12) United States Patent
Brandt

(10) Patent No.: US 7,168,554 B2
(45) Date of Patent: Jan. 30, 2007

(54) GRAIN CART AND AUGER CONSTRUCTION

(75) Inventor: Edward Oliver Brandt, Batesville, AR (US)

(73) Assignee: Pitonyak Machinery Corporation, Carlisle, AR (US)

( * ) Notice: Subject to any disclaimer, the term of this patent is extended or adjusted under 35 U.S.C. 154(b) by 0 days.

(21) Appl. No.: 10/893,620

(22) Filed: Jul. 16, 2004

(65) Prior Publication Data
US 2005/0031440 A1 Feb. 10, 2005

Related U.S. Application Data

(60) Provisional application No. 60/487,720, filed on Jul. 17, 2003.

(51) Int. Cl.
*B65G 33/32* (2006.01)

(52) U.S. Cl. .................. 198/668; 198/672; 198/674

(58) Field of Classification Search ............. 198/657, 198/666, 668, 672, 674
See application file for complete search history.

(56) References Cited

U.S. PATENT DOCUMENTS

| | | | | | |
|---|---|---|---|---|---|
| 796,477 | A | * | 8/1905 | Wallace | 141/236 |
| 1,689,963 | A | * | 10/1928 | Pelton | 198/668 |
| 2,927,682 | A | * | 3/1960 | Dorris et al. | 198/674 |
| 3,125,211 | A | * | 3/1964 | Macy | 198/674 |
| 3,132,739 | A | * | 5/1964 | Folke et al. | 198/625 |
| 3,194,385 | A | * | 7/1965 | Barnese | 198/550.1 |
| 3,240,313 | A | * | 3/1966 | Blattner | 198/536 |
| 3,241,657 | A | * | 3/1966 | Buschbom | 198/550.6 |
| 3,252,562 | A | * | 5/1966 | Brembeck | 198/550.1 |
| 4,274,790 | A | * | 6/1981 | Barker | 414/502 |
| 4,572,356 | A | * | 2/1986 | Janick | 198/667 |
| 4,669,945 | A | * | 6/1987 | Pollard et al. | 414/505 |
| 4,846,621 | A | * | 7/1989 | Warsaw | 414/526 |
| 5,013,208 | A | * | 5/1991 | Grieshop | 414/526 |
| 5,183,148 | A | * | 2/1993 | Kondo | 198/674 |
| 5,263,572 | A | * | 11/1993 | Hove | 198/672 |
| 5,328,015 | A | * | 7/1994 | Volk, Jr. et al. | 198/548 |
| 5,340,265 | A | | 8/1994 | Grieshop | |
| 5,516,253 | A | | 5/1996 | Linscheid | |
| 5,538,388 | A | | 7/1996 | Bergkamp | |
| 5,628,608 | A | * | 5/1997 | Linscheid et al. | 414/526 |
| 6,017,182 | A | | 1/2000 | Grieshop | |
| 6,206,177 | B1 | | 3/2001 | Broten | |
| 6,261,050 | B1 | * | 7/2001 | Kuhns | 414/526 |
| 6,422,376 | B1 | * | 7/2002 | Nichols et al. | 198/668 |
| 6,497,546 | B2 | | 12/2002 | Wood | |

* cited by examiner

*Primary Examiner*—Gene O. Crawford
*Assistant Examiner*—Mark A. Deuble
(74) *Attorney, Agent, or Firm*—Baker Botts L.L.P.

(57) ABSTRACT

A folding auger assembly. The auger assembly includes at least one auger housing configured to receive at least one driveshaft. The auger assembly further includes flighting connected to each driveshaft, a lower drive assembly configured to operatively couple the driveshaft to a first end of an output driveshaft, a driveshaft support assembly coupled to the lower drive assembly and configured to receive the first driveshaft, an output driveshaft disengagement assembly coupled to the lower drive assembly, and a stabilizer assembly.

12 Claims, 14 Drawing Sheets

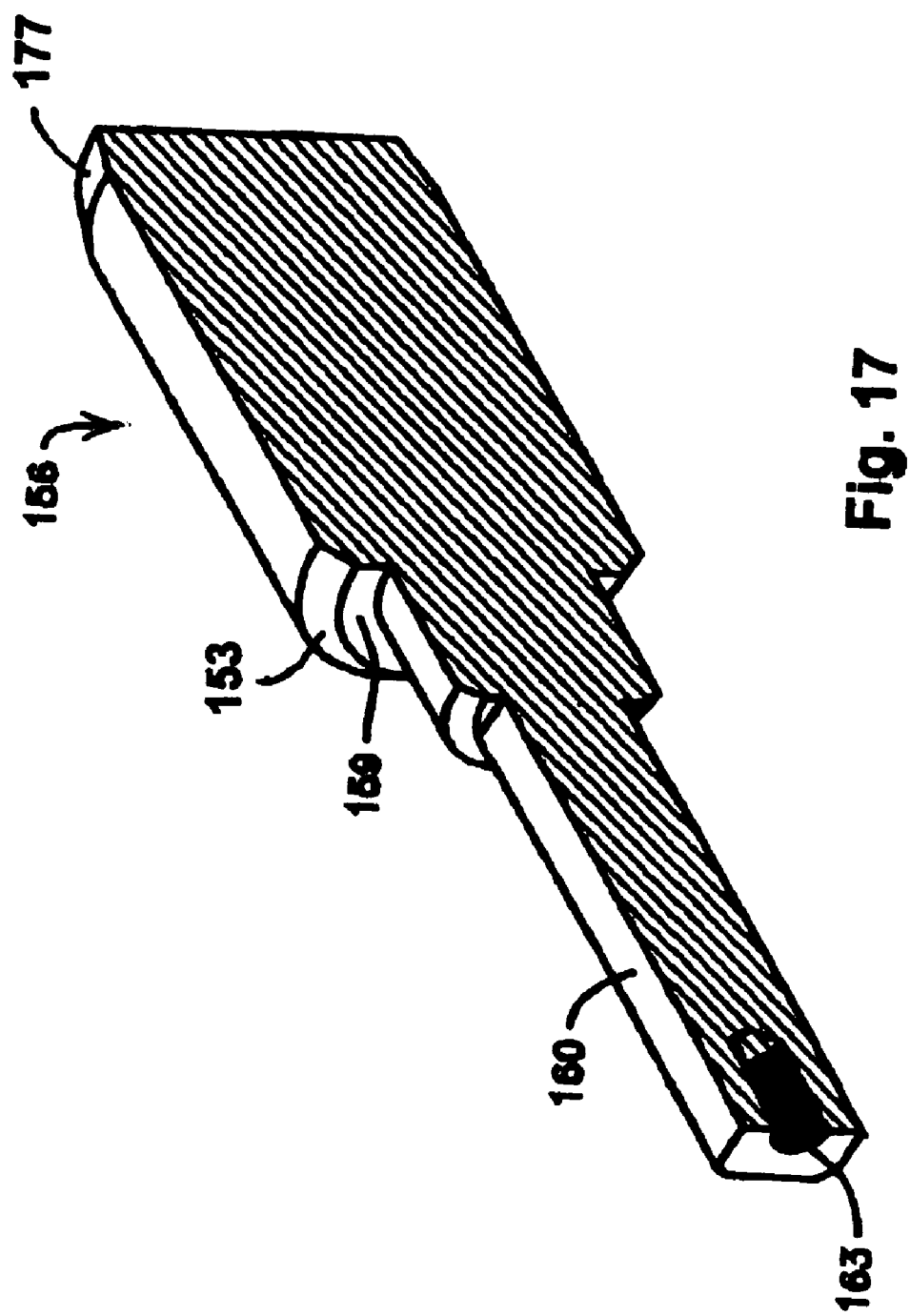

GRAIN CART AND AUGER CONSTRUCTION

This invention claims priority from provisional application No. 60/487,720 filed Jul. 17, 2003.

BACKGROUND OF THE INVENTION

1. Field of the Present Invention

The present invention relates generally to systems that convey bulk commodities from primary locations in carts and wagons to secondary locations such as barns, silos, trailers, and train cars. More particularly, this invention relates to an improved, two-piece folding auger system for grain carts, and to grain carts equipped with auger assemblies.

2. History of Related Art

Numerous agricultural implements including combines, harvesters, and grain carts are equipped with internal grain storage hoppers. Grain harvested from the field may be conveyed for short term storage into mobile hoppers such as grain carts for subsequent towing to larger storage bins or silos, or for transport to truck or railroad yards. For example, grain carts are commonly deployed during the process known as combining, where they are towed into a convenient, receptive position by a tractor proximate a combine to periodically receive the combine's contents for short term storage and later transfer.

Fluids and grain are moved by commonly understood displacement means along a continuous spiral fin helically disposed around rotating shafts. The continuous fin is sometimes called "flighting," the apparatus is typically called an "auger," and such displacement is generally called "augering." As recognized by those skilled in the art, various powered augers with spiral flighting are employed to move grain from containers such as carts, wagons, trailers, truck beds, hoppers, and silos. Conventional augers may be powered by hydraulics, pneumatics, or a power-take-off (PTO), the standard means of gearing by which power from a tractor is externally transferred to various farm implements through commonly understood couplings.

Retractable auger systems typically include two or more foldable sections that are un-folded for use and folded for transport or storage. These auger systems are typically made of a fixed lower section inside of or adjacent to a hopper, and a moveable upper section that is un-folded into an operative position coaxially aligned with the lower section. When properly deployed, the upper auger section delivers grain to a desired receptacle. When retracted, the upper auger section nests against the cart body and assumes a safe, out-of-the-way orientation that facilitates cart movement.

Typically, both auger sections include internal drive shafts that have spiraled flighting built into or attached to their outer diameters. When configured for operation (i.e., in the un-folded, operative position), the auger sections are aligned substantially coaxially, and their internal drive shafts axially mate. The power source that typically drives the lower auger section is thus indirectly coupled to the upper auger section. Various couplers that are well known in the art mate the two sections. For example, the auger drive shafts may be connected with a universal joint or with a coupling assembly that provides a "quick connect." Such a connection for quickly mating the upper and lower auger sections may include an aligning pilot shaft made a part of the lower section drive shaft and centered within an annular bearing. A plurality of radial drive teeth projecting from an annular surface on the lower auger drive shaft engage similarly arrayed teeth on the upper section drive shaft. The coupler teeth are meshed when the auger segments are in the un-folded, operative position, and the drive shafts are substantially aligned.

Grain cart augers are subjected to appreciable stresses. The load borne by the flighting during high volume operation exerts appreciable lateral and torsional stress on the drive apparatus, flighting, drive shafts, and the shaft control bearings. Stresses are dynamically imposed on the structure in a variety of changing directions. Occasionally, particularly at start-up, a load jars the apparatus and subjects the flighting to forces that tend to unbalance or misalign the multiple auger sections. Improper auger section alignment can easily result in bearing failure and other damage to the apparatus.

Prior art grain cart auger mechanisms suffer from maintenance and reliability problems. Mechanisms must be rugged in order to withstand the impacts and the rain, dust, and temperature changes inherent in farm use. Mechanisms that have moving parts are particularly vulnerable to harsh operating conditions. And mechanisms that are built in sections for conversion from an un-folded, operating profile to a folded, transport profile are also vulnerable. Accordingly, it Would be beneficial to have an auger assembly that can withstand harsh conditions and be easy to maintain and have sections that easily align when the auger assembly is in the un-folded, operative position.

SUMMARY OF THE INVENTION

The present invention provides an improved stabilized, multiple section auger assembly. The present invention withstands harsh farm usage and provides for easy maintenance and has sections that easily align when the present invention is in the un-folded, operative position. Its self-centering, flexible design reduces auger jamming and drivetrain wear. For improved serviceability over prior art, the present invention provides a simplified means of disengaging the auger drive assembly from the gearbox that drives the auger assembly. This enables easy removal of the lower auger driveshaft from the drive gear for maintenance purposes. The present invention's disclosed preferred provision for disengagement of seized or rusted drive shaft components significantly enhances the auger assembly's maintenance and serviceability. Furthermore, the present invention has special adaptations for preservation of alignment and dependable coupling of the multiple auger sections. The new auger system may also be easily retracted and folded into a stable storage position when not in use.

In the preferred embodiment, the new auger assembly has a lower stationary section and a foldable upper section that features a self-centering and stabilizing mechanism. The movable upper section is hinged to the fixed lower section. The bottom of the lower section is configured to communicate with a cart hopper. The bottom of the upper section is mated to the top of the lower section, thus creating a drive link between the two sections. When the deployed auger system is activated, grain or other materials are conveyed from the hopper's interior through the aligned auger sections to a material discharge chute. Both the upper and lower sections are uniquely designed for improved resistance to the potentially damaging torsional and axial forces encountered during heavy use.

The driveshafts of the present invention may be supported by one or more thrust bearings, and the upper section features a stabilizer assembly at its top to preserve concentricity while allowing axial displacements. The upper section terminates at its top in a projecting stabilizer assembly that is terminated within a centered bearing assembly. In one embodiment of the present invention, a rigid coiled spring coaxially mounted on the stabilizer assembly normally urges the upper section downwardly into driving engagement with the lower section.

BRIEF DESCRIPTION OF THE DRAWINGS

In the following drawings, like reference numerals have been employed throughout wherever possible to indicate like parts in the various views. In some of the drawings, parts of the apparatus are broken away, omitted, or shown in section for clarity. The structure and operation of the invention will become apparent upon reading the following detailed description and upon reference to the accompanying drawings in which:

FIG. 17 is a sectioned longitudinal isometric view of the stabilizer assembly.

Figure 1:
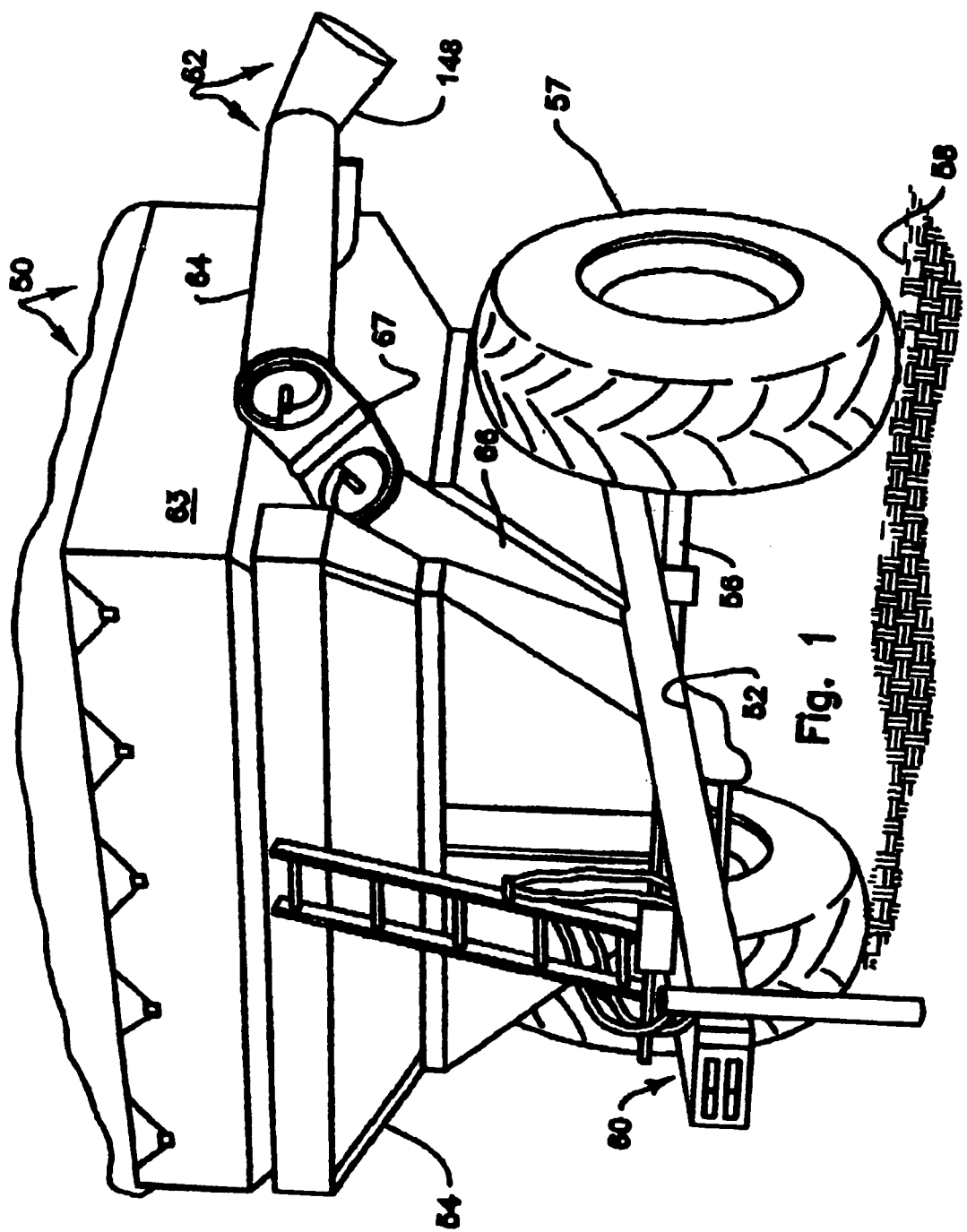
FIG. 1 is a front isometric view of a grain cart equipped with the preferred auger assembly.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

As illustrated in FIG. 1, auger assembly 62 may be connected to grain cart 50. Cart 50 includes a rigid frame 52 that supports a central hopper 54 that resembles a hollow, inverted, truncated pyramid. As is conventional in such devices, grain loaded into central hopper 54 through opened top 63 falls under the force of gravity toward the bottom of the hopper where it contacts lower auger section 66. Frame 52 includes a rigid, elongated, wheeled axle 56 supporting wheels 57 that traverse the field or ground 58. The tongue assembly 60 projecting from the front of central hopper 54 enables towing by conventional farm machinery, preferably accomplished with suitable hydraulic connections. In the present invention, a preferably multiple-piece auger assembly 62 is located on one side of cart 50.

Auger assembly 62 includes a movable, upper auger section 64 hinged to a stationary lower auger section 66. The bottom of lower auger section 66 communicates with the interior of central hopper 54. Hinge 67 couples upper auger section 64 to lower auger section 66. Upper auger section 64 is illustrated in the folded, out-of-the way transport position, disengaged from lower auger section 66. When central hopper 54 is to be unloaded, upper auger section 64 is un-folded into axial alignment with lower auger section 66, and the upper and lower sections are coupled in a manner discussed below.

When auger assembly 62 is activated by means of a drive mechanism, discussed below, that rotates the augers in auger sections 64 and 66, grain is conveyed from the interior of central hopper 54 upwardly and outwardly through the aligned auger sections for eventual delivery to a remote storage bin, or the like, through discharge chute 148 that may be oriented in various directions. In the preferred embodiment, upper auger section 64 is hydraulically displaced between the normal deployed position and the retracted transport position illustrated in FIG. 1. Various mechanisms for displacing multiple-part, folding auger assemblies between the normal deployed position and the retracted transport position are well known in the art.

To ensure proper operative alignment and concomitant durability of the deployed auger sections, the present invention provides unique mechanical adaptations of auger sections 64 and 66. For assurance that the entire load of both auger sections is not borne by the drive mechanism, lower auger section 66 is rigidly attached to central hopper 54, and the auger driveshafts, described below, are supported by thrust bearings that transfer the weight of auger assembly 62, as well as the axial forces developed in the auger sections' driveshafts, to auger sections 64 and 66 that in turn transfer the weight to central hopper 54.

Figure 2:
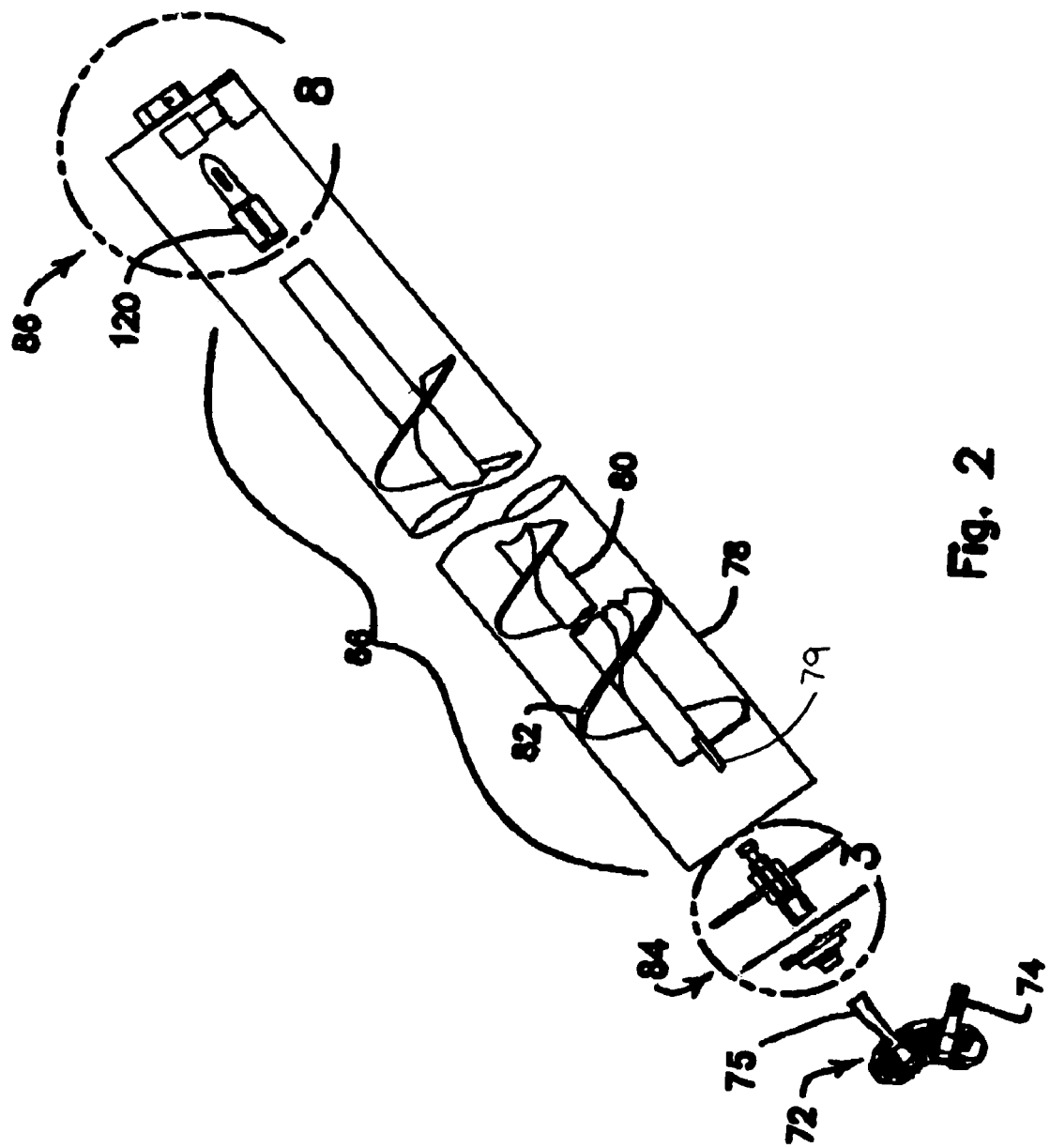
FIG. 2 is an enlarged, exploded, elevation assembly view of the lower auger section.

FIG. 2 is an enlarged, exploded, elevation assembly view of the lower auger section of the present invention. Lower auger section 66 may be connected to a twin shaft reduction gearbox 72 through lower drive assembly 84. A suitable gearbox unit is the fifty-degree version available from the Superior Gear Box Co. of Stockton, Mo. Power is delivered to gearbox 72 via input shaft 74 that may be connected with a flexible drive shaft (not shown) to a tow vehicle's PTO output, or to a suitable drive motor.

As explained below, the bottom of upper auger section 64 connects to the top of lower auger section 66 when upper auger section 64 is deployed for operation. Gearbox output driveshaft 75 drives lower drive assembly 84 which in turn drives driveshaft 80 of lower auger section 66 which in turn drives driveshaft 142 of upper auger section 64 (see FIG. 9), thus causing rotation of the entire auger assembly.

As further illustrated in FIG. 2, lower auger section 66 includes an elongated auger housing 78 in which driveshaft 80 supporting conventional helical flighting 82 is coaxially disposed. In a preferred embodiment of the present invention, auger housing 78 is tubular shaped. Driveshaft 80 extends from lower drive assembly 84 and engages upper drive assembly 86 at the top of lower auger section 66 with an elongated pilot shaft 120. As used herein, "flighting" refers to appendages of any geometry, continuous or discontinuous, symmetrical or asymmetrical, helical or non-helical, that are configured to move objects along an axis when attached to a substantially central member that is rotated about such axis.

Figure 3:
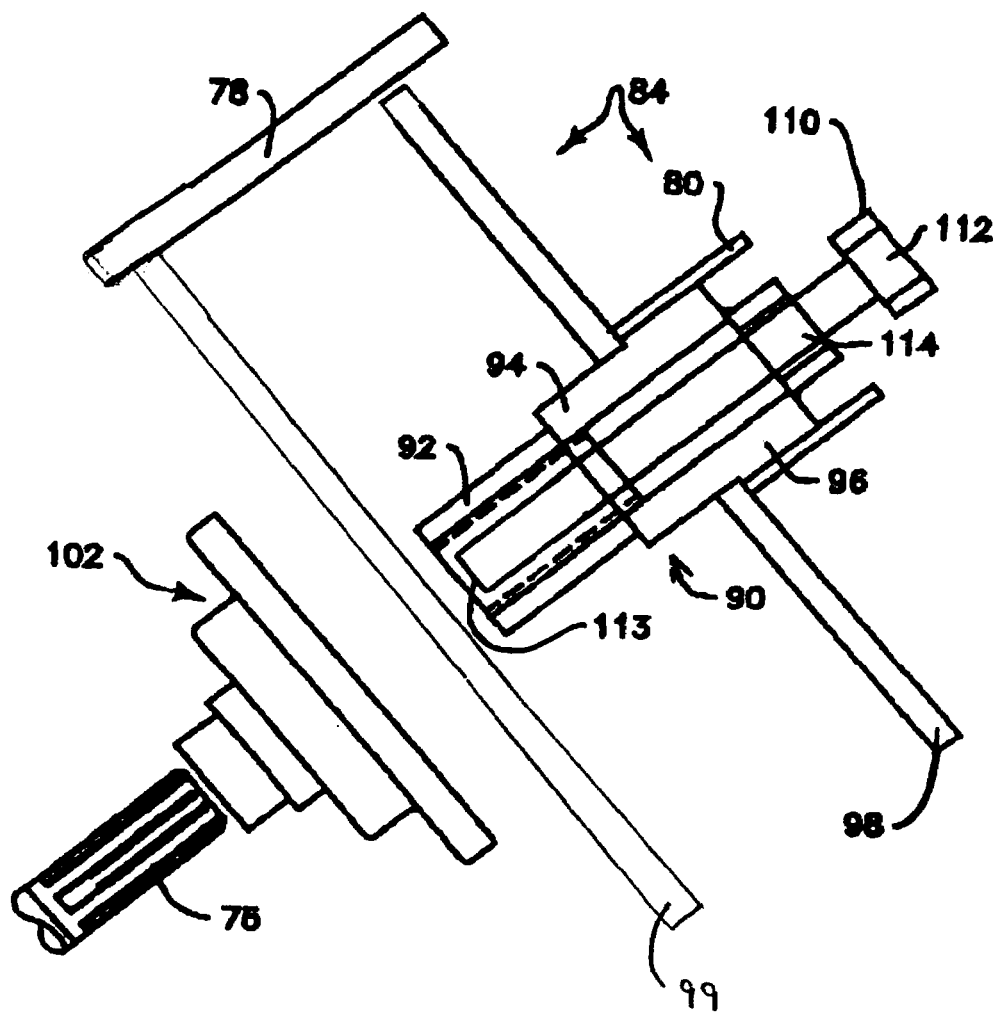
FIG. 3 is an enlarged, partially exploded elevation view of the lower auger section's lower drive assembly, corresponding to circled region "3" of FIG. 2.

FIG. 3 is an enlarged, partially exploded elevation view of lower drive assembly 84 according to the preferred embodiment of the present invention. As depicted in FIG. 3, lower drive assembly 84 may include drive collar 90 that coaxially receives the lower hollow end of auger driveshaft 80. In a preferred embodiment of the present invention, drive collar 90 is rigid and splined and includes an elongated splined cylindrical shank 92, an intermediate cylindrical section 94, and an upper, larger diameter cylindrical head 96. Drive collar 90 is coaxially fitted to circular drive plate 98, with shank 92 penetrating plate orifice 109 of lower auger plate 99 (see FIG. 5). In a preferred embodiment of the present invention, drive plate 98 is welded to drive collar 90; lower auger plate 99 is circular disk sized and welded so as to close the lower end of auger housing 78; and shank 92 is supported within driveshaft support assembly 102.

In a preferred embodiment of the present invention, drive plate 98 rotates within the lower end of auger housing 78 and includes orifice 55 (see FIG. 6) which is configured to receive drive pin 79 (see FIG. 2) connected to driveshaft 80. In this preferred embodiment, output driveshaft 75 turns drive collar 90 which in turns drives drive plate 98 which in turn drives driveshaft 80 by way of drive pin 79. It should be noted, that connection of driveshaft 80 to drive plate 98 by way of drive pin 79 permits driveshaft 80 to rest upon drive collar 90 and to be removed from lower auger section 66 without the need to remove lower drive assembly 84. In an alternative embodiment of the present invention, lower drive assembly may be a gearbox, sleeve, or other coupling mechanism that operatively connects output driveshaft 75 to driveshaft 80.

It may occasionally be necessary to service auger assembly 62. For example, when changing gearbox 72, output driveshaft 75 must be disengaged from lower drive assembly 84. Specifically, output driveshaft 75 must be disengaged from driveshaft support assembly 102 and collar shank 92. After long periods of time, and with insufficient lubrication, these parts may develop a tendency to seize, making separation difficult. For this reason, output driveshaft disengagement assembly 117 (see FIG. 4) is provided to facilitate the decoupling of output driveshaft 75 from driveshaft support assembly 102. Service bolt 110 is threadably coupled to drive collar 90 in coaxial alignment with driveshaft 80. Service bolt 110 may include bolt head 112 that drives integral threaded shank 113 through the threaded inner diameter of drive collar 90. In a preferred embodiment of the present invention, bolt head 112 is hexagonal in shape. When bolt head 112 is sufficiently rotated, the tip of shank 113 exits the drive collar's splined shank 92 and makes contact with the tip of output driveshaft 75 that protrudes through driveshaft support assembly 102. Service bolt 110 is normally maintained in a non-interfering fixed position atop drive collar 90 by retainer nut 114 that is tightened upon initial assembly. Thus, during normal operation, service bolt 110 is not engaged. However, when auger driveshaft 80 is removed from collar head 96 for service, bolt head 112 and retainer nut 114 are accessible. In one embodiment of the present invention, access to bolt head 112 and retainer nut 114 is through a service door in the side of lower auger section 66. After retainer nut 114 is loosened, service bolt 110 may be turned to force shank 113 into contact with output driveshaft 75, forcibly disengaging drive collar 90 from gearbox 72.

Figure 4:
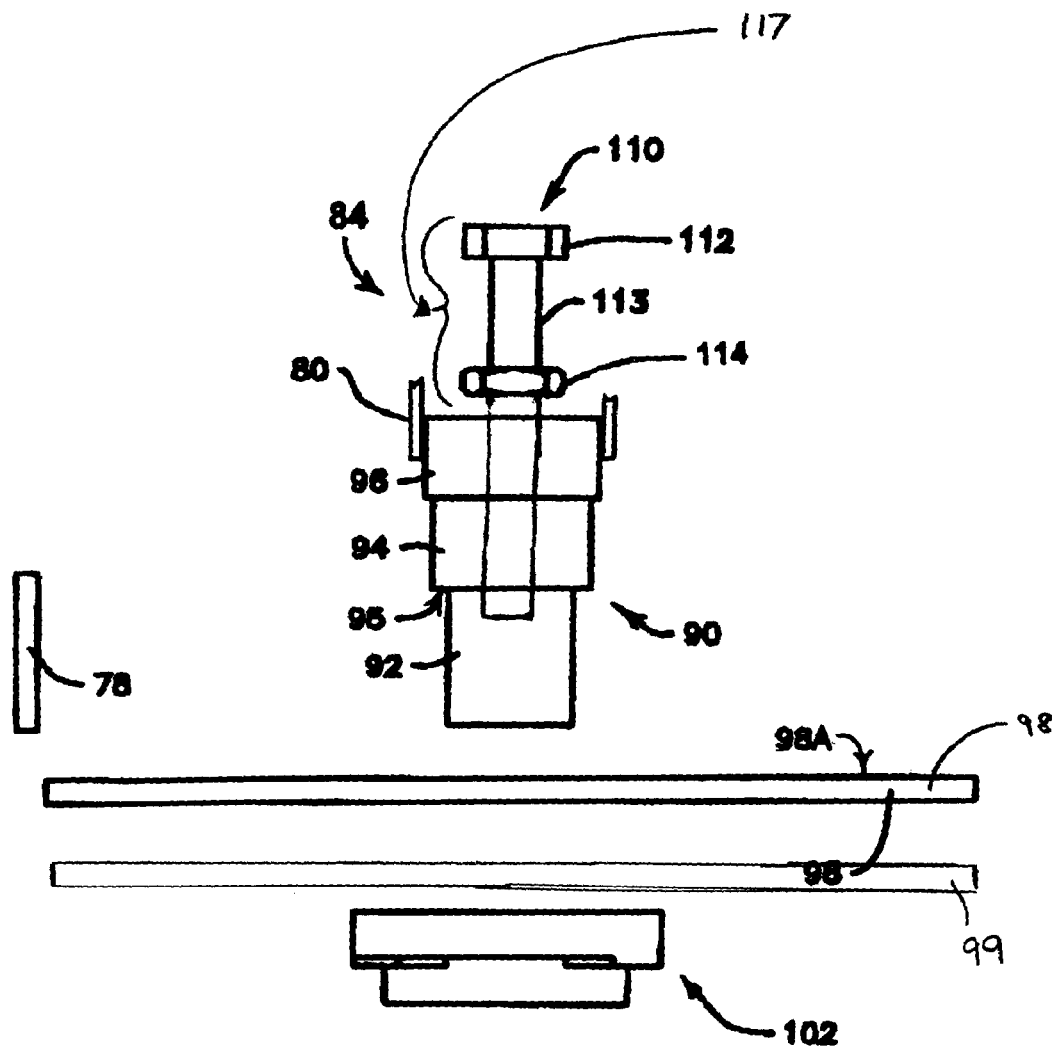
FIG. 4 is an enlarged, exploded elevation view of the lower auger's lower drive assembly.

FIG. 4 is an enlarged, exploded elevation view of lower drive assembly 84. In a preferred embodiment of the present invention, drive collar 90 mounts coaxially atop drive plate 98, with shoulder 95 beneath intermediate cylindrical section 94 mounted flush with the upper surface 98A of drive plate 98. As noted above, driveshaft 80 may be connected to drive plate 98 by way of drive pin 79 so that driveshaft 80 and its flighting 82 are rotated in response to rotation imparted by gearbox 72. FIG. 4 also shows service bolt 110 discussed above.

Figure 5:
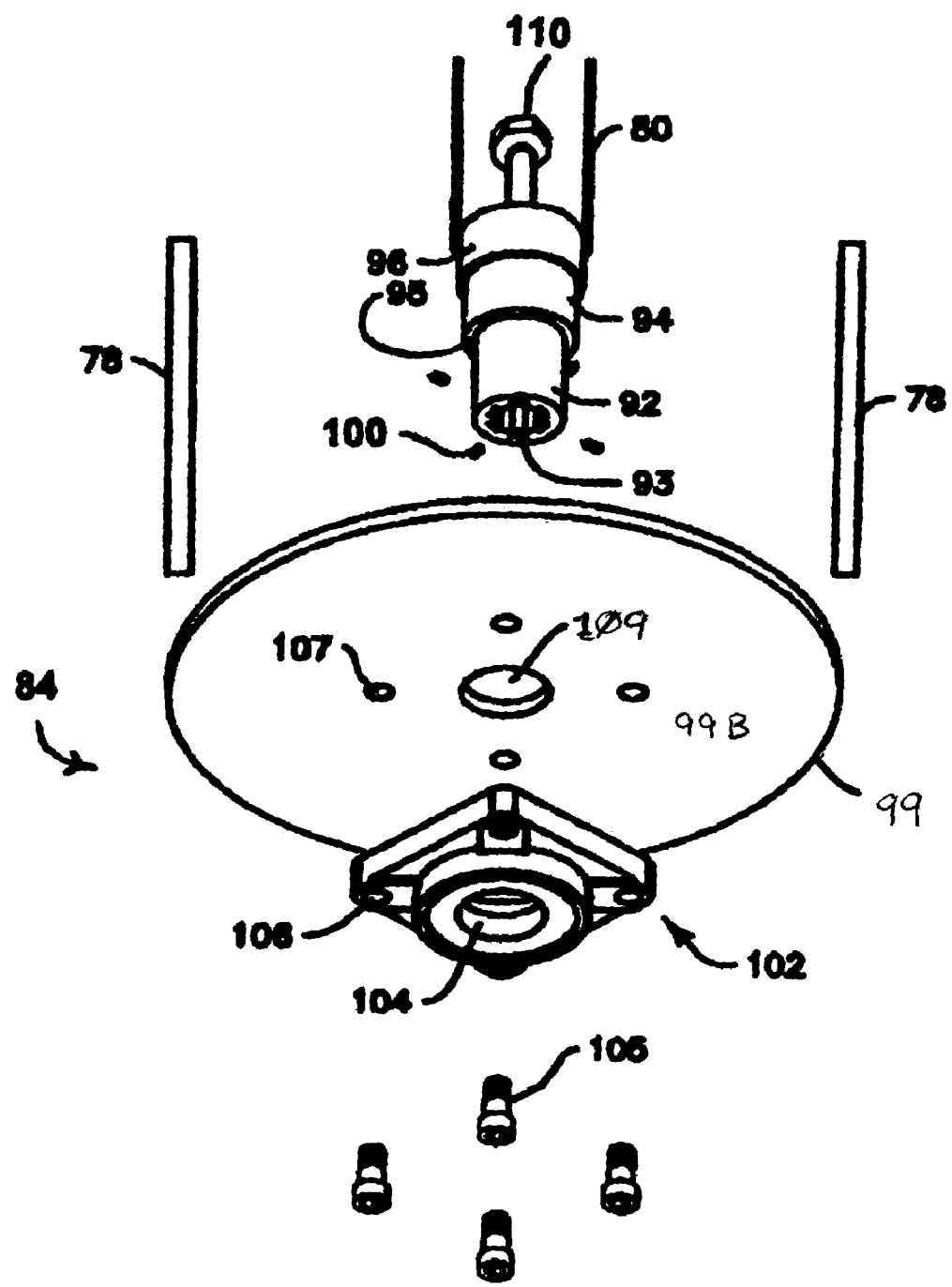
FIG. 5 is a partially exploded isometric view of the lower auger section's lower drive assembly.

FIG. 5 is a partially exploded isometric view of the lower drive assembly 84. It will be noted that drive plate 98 is not shown. Output driveshaft 75 (see FIGS. 2 and 3) is coaxially fitted within splined passageway 93 in collar shank 92. In a preferred embodiment of the present invention, shoulder 95 limits the distance that collar shank 92 extends through orifice 109 and orifice 104 and driveshaft 75 fits securely within splined passageway 93 without the use of fasteners. In an alternative embodiment, output driveshaft 75 is secured to passageway 93 by radially spaced-apart Allen screws 100. While torsional forces are thus imparted by output driveshaft 75, driveshaft support assembly 102 bears the majority of the axial load imparted by the auger section and thereby, significantly reduces both the radial and thrust forces that would otherwise be placed on output driveshaft 75 by driveshaft 80. It will be noted that coupling of driveshaft support assembly 102 to lower auger plate permits these radial and thrust forces to dispersed to auger housing 78. Collar shank 92 extends through orifice 109 into and through orifice 104 in driveshaft support assembly 102 and the weight of driveshaft 80 is thereby supported by driveshaft support assembly 102 which in turn is mounted beneath lower auger plate 99 upon bottom surface 99B by a plurality of bolts 105 that penetrate bearing mounting orifices 106 and the aligned orifices 107 in lower auger plate 99. It should be noted that attachment of driveshaft support assembly 102 to lower auger plate 99 and the insertion of driveshaft 75 into splined passageway 93 results in lower auger section 66 being sealed and, thereby, preventing materials being discharged by the present invention from escaping through the bottom of lower auger section 66. While bolts 105 are depicted with the heads contacting driveshaft support assembly 102, it will be appreciated that bolts 105 may be inserted from the opposite direction so that the heads of bolts 105 contact the upper surface of lower auger plate 99. In one embodiment of the present invention, bolts 105 are plow bolts with a four corner shoulder that fit into aligned orifices 107 (which orifices 107 are square shaped so as to securely receive bolts 105), and bolts 105 may be secured by center lock nuts.

Figure 6:
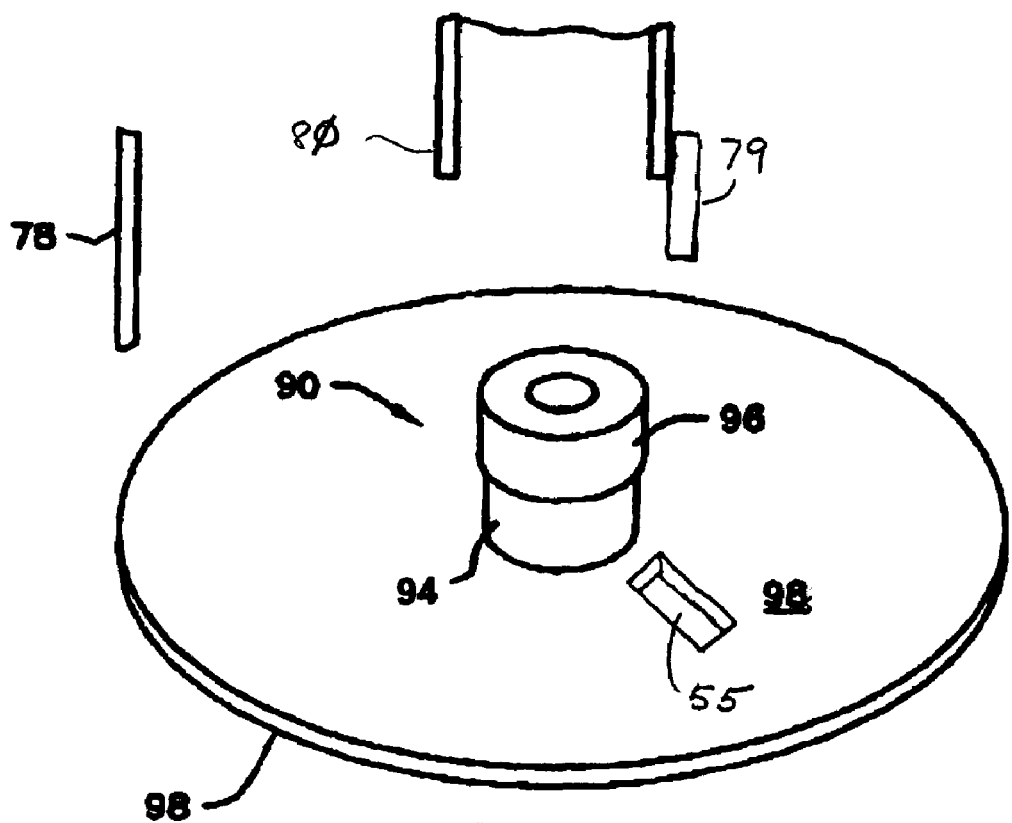
FIG. 6 is a top isometric view of the lower auger section's lower drive collar.
Figure 7:
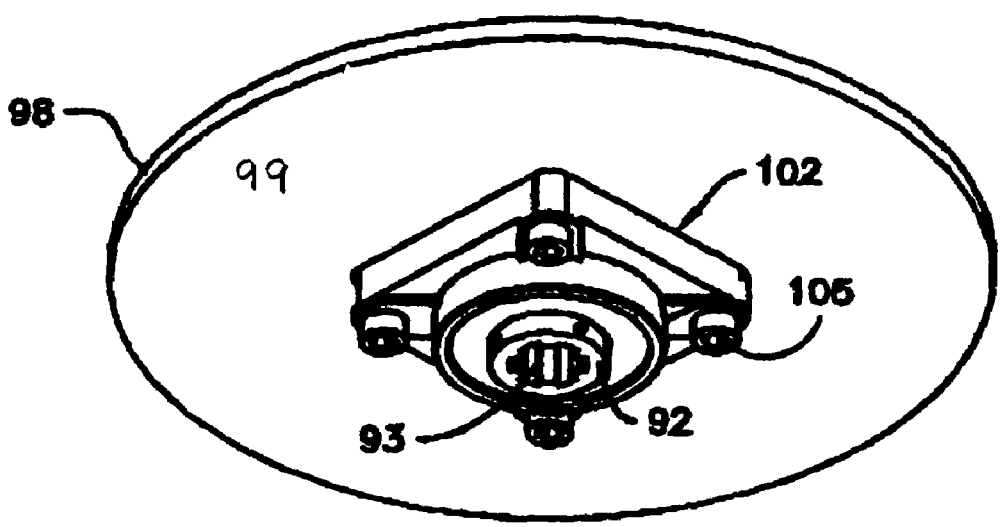
FIG. 7 is a bottom isometric view of the lower auger section's lower drive bearing.

FIGS. 6 and 7 show alternative views of drive collar 90, the hollow portion of lower driveshaft 80, drive pin 79, and splined collar shank 92 protruding from driveshaft support assembly 102. As noted above, while bolts 105 are depicted with the heads contacting driveshaft support assembly 102 in FIG. 7, it will be appreciated that bolts 105 may be inserted from the opposite direction so that the heads of bolts 105 contact the upper surface of lower auger plate 99.

Figure 8:
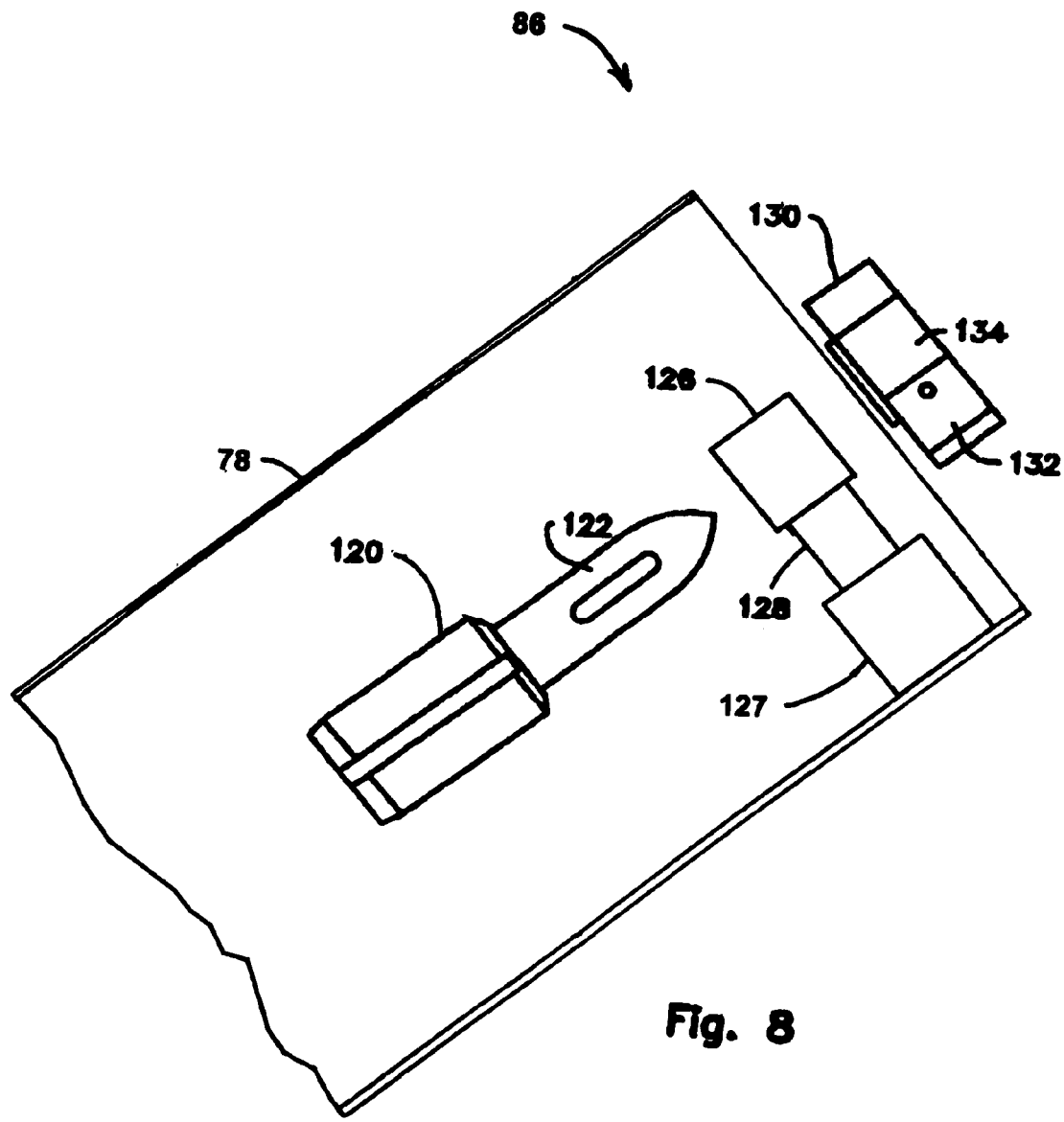
FIG. 8 is a partially exploded, elevation view of the lower auger section's upper coupling assembly that corresponds to circled region "8" of FIG. 2.

FIG. 8 is a partially exploded, elevation view of one embodiment of an upper coupling assembly for lower auger section 66 that corresponds to circled region "8" of FIG. 2. In a preferred embodiment of the present invention, upper coupling assembly 86 may be located at the top of lower auger section 66 and provides driveable connection to upper auger section 64 when upper auger section 64 is un-folded into the deployed operational position. The uppermost end of lower auger driveshaft 80 (shown in FIG. 2) is coupled to elongated pilot shaft 120 that includes a terminal drive portion 122. Driveshaft 80 is suspended for rotation within auger housing 78. In a preferred embodiment of the present invention, driveshaft 80 is suspended for such rotation by hanger bearing 126 that is joined by at least one spoke 128 to partially circumferential flange 127 that is attached to the inner cylindrical surface of auger housing 78. Drive portion 122 of pilot shaft 120 protrudes through the inner diameter of hanger bearing 126 and is attached to the inner diameter of upper drive gear 130 with commonly understood fasteners such as Allen screws. In a preferred embodiment of the present invention, drive portion 122 of pilot shaft 120 is keyed and is attached to the inner diameter of upper drive gear 130 with key and Allen screws. Radial teeth 132 of drive gear 130 are separated by radial spaces 134. Hanger bearing 126 achieves centering and alignment, and acts as a radial bearing for driveshaft 80.

Figure 9:
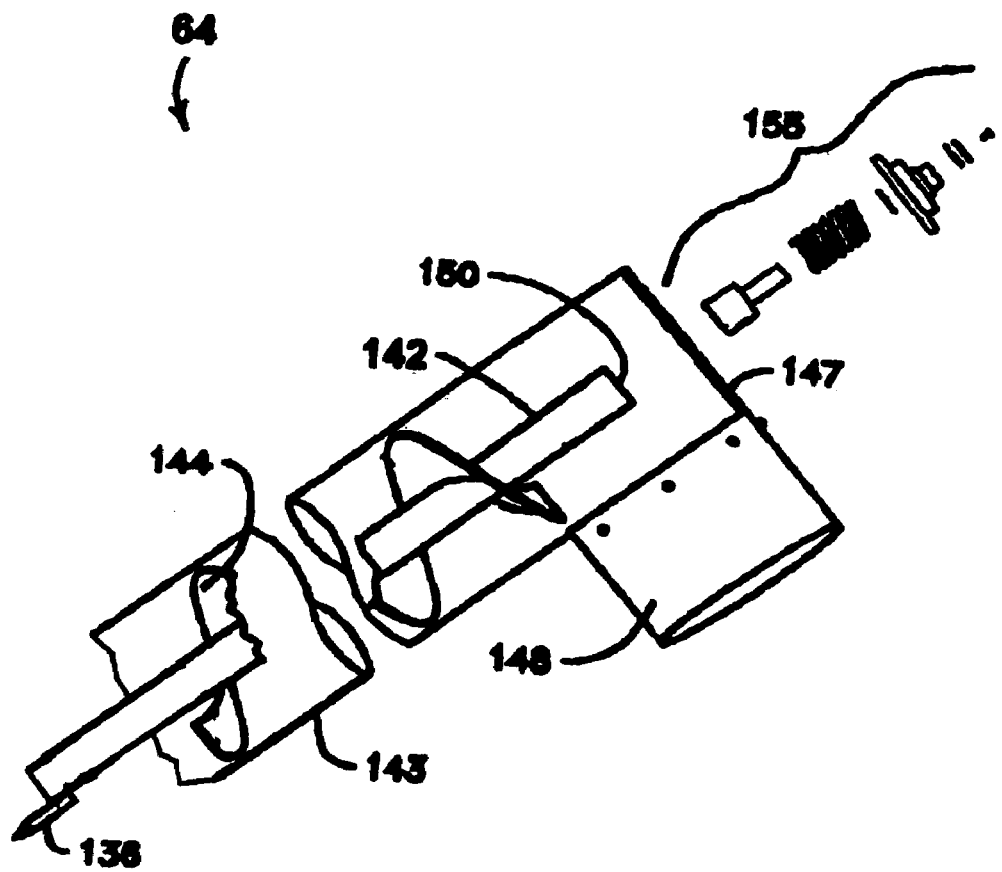
FIG. 9 is a partially exploded elevation assembly view of the upper auger section.

FIG. 9 is a partially exploded elevation assembly view of upper auger section 64. In a preferred embodiment of the present invention, upper auger section 64 may include elongated tubular housing 143 that is concentric with the internal driveshaft 142 that supports conventional spiral flighting 144. The upper end of tubular housing 143 terminates in upper auger plate 147, that may be adjacent to discharge chute 148. The uppermost end 150 of driveshaft 142 is terminated and supported by stabilizer assembly 155, discussed below. While shown outside of tubular housing 143 for clarity, it is to be noted that portions of stabilizer assembly 155 are contained within tubular housing 143 as noted in more detail in FIG. 10.

In the preferred embodiment of the present invention, at least one drive pin 136 is welded to and projects downwardly from driveshaft 142 of upper auger section 64. Upper auger section 64 is foldably connected to lower auger section 66 with conventional hinge 67 (see FIG. 1), and when upper auger section 64 is un-folded into the operative position, at least one drive pin 136 is pressed downwardly to engage drive gear 130 at the top of lower auger section 66 (see FIG. 8). When upper auger section 64 is first un-folded into the operative position relative to lower auger section 66, drive pin 136 may or may not engage drive gear 130. If drive pin 136 fails to engage a space between two of the gear teeth on drive gear 130, the spring-loaded feature of stabilizer assembly 155 will enable hinge 67 to close and the upper and lower auger sections 66 and 64 to be securely mated. In that case, when rotation of lower auger section driveshaft 80 commences, drive gear 130 will rotate, causing drive pin 136 to fall into a space between two adjacent drive gear teeth 132 under spring-loaded downward urging from stabilizer assembly 155. Such spring-loaded engagement is automatic, and the bearing assembly 162 (discussed and shown in FIG. 10 below) centering effects will maintain proper operative alignment.

Figure 10:
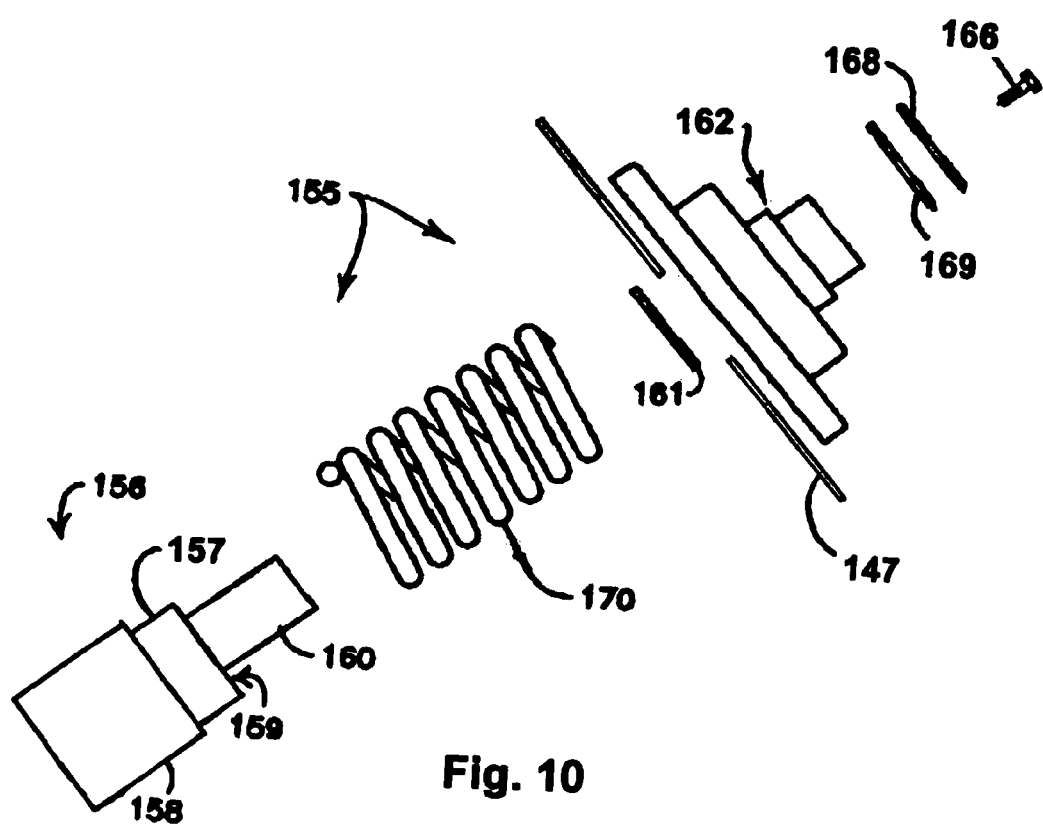
FIG. 10 is an enlarged, partially exploded elevation view of the upper auger section's stabilizer assembly.

FIG. 10 is an enlarged, partially exploded elevation view of stabilizer assembly 155 of upper auger section 64 and shows that, concurrent with its provision of concentricity between upper auger section 64 and lower auger section 66, the present invention accommodates axial displacement of the lower and upper section driveshafts 80 (see FIG. 2) and 142 (see FIG. 9), respectively. Compression spring 170 concentrically mounts on neck 160 and intermediate section 157, and abuts shoulder 159 of stabilizer 156. When assembled, spring 170 is compressed between shoulder 159 and the underside of upper auger plate 147. Stabilizer 156 and neck 160 are axially slideable with respect to the upper auger plate 147 as compression spring 170 compresses or elongates. Thus, axial displacement of lower auger driveshaft 80 and its flighting 82, and upper auger driveshaft 142 and its flighting 144 are accommodated, i.e., the auger assembly driveshaft axial displacement is constrained only to the extent of desired allowable compression of spring 170. While the preferred embodiment of the present invention includes spring 170, alternative embodiments of the present invention may include other compression devices well know in the art for maintaining the downward force on driveshaft 142.

In a preferred embodiment of the present invention, stabilizer 156 includes a rigid, cylindrical base 158, a concentric cylindrical intermediate section 157, and neck section 160. Cylindrical base 158 is coaxially coupled to upper end 150 of driveshaft 142 of upper auger section 64. In a preferred embodiment of the present invention, upper end 150 of driveshaft 142 is welded to cylindrical base 158. In an alternative embodiment, such coupling may be accomplished by threading means. Alternatively, connection may be accomplished by being received into a hollow end of driveshaft upper end 150 and secured by means of fasteners such as Allen screws.

Neck 160 projects through compression spring 170, an opening in bushing 161, and upper auger plate 147, and is received within bearing assembly 162. In a preferred embodiment of the present invention, neck 160 is square shaped and the opening in bushing 161 is square shaped. Retaining bolt 166 penetrates washer 168 and bushings 169 and 161, and engages a tapped hole in neck 160 on stabilizer 156 to axially capture upper auger driveshaft 142 and flighting 144 within housing 143. The number of bushings 169 can be varied to affect both spring 170 preloading and the axial displacement of driveshaft 142 so as to facilitate alignment with driveshaft 80 when upper auger section 64 is un-folded into the operative position.

Figure 11:
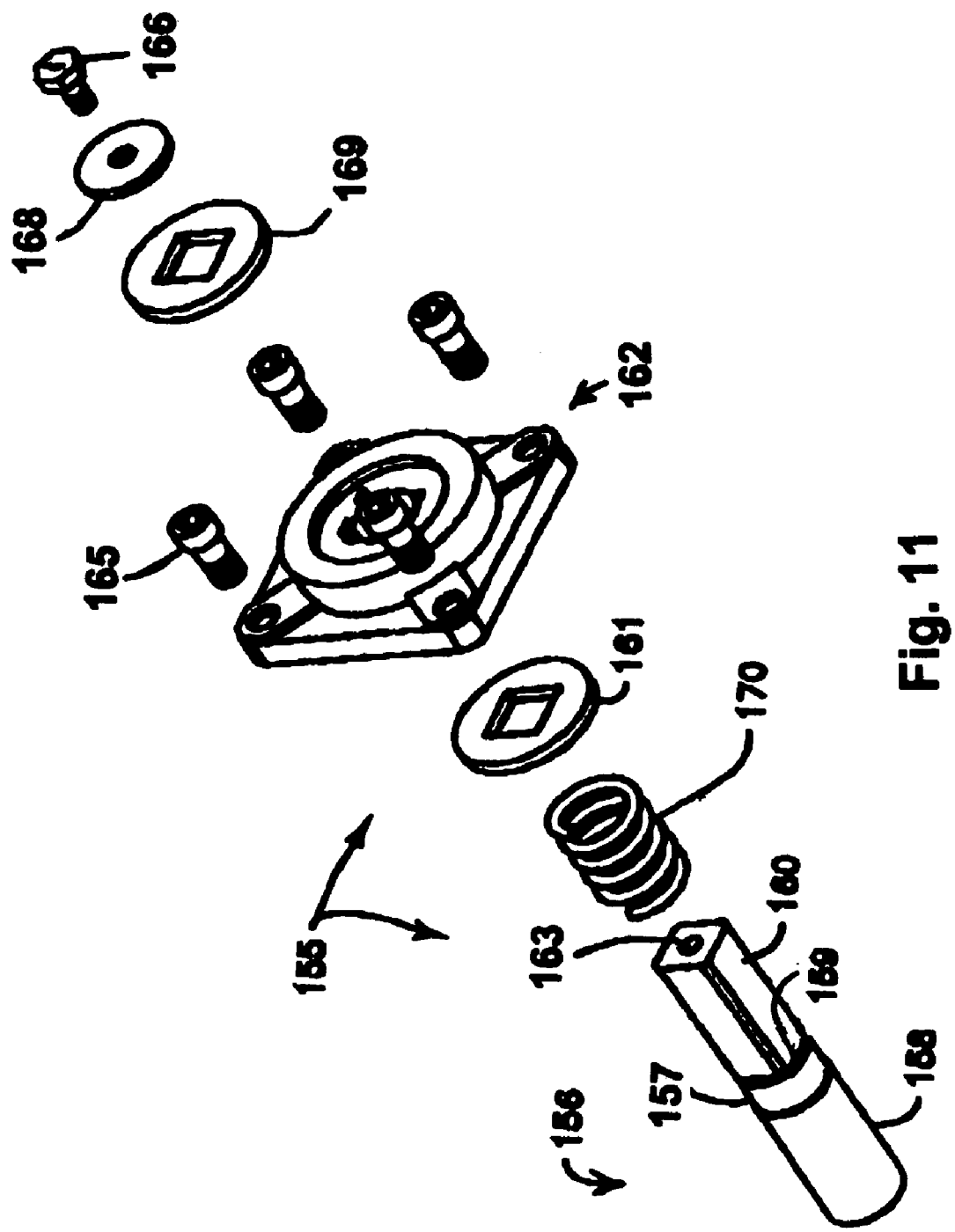
FIG. 11 is a partially exploded isometric view of the upper auger section's stabilizer assembly.

FIG. 11 is a partially exploded isometric view of stabilizer system 155 of upper auger section 64. In a preferred embodiment of the present invention, bearing assembly 162 facilitates rotation of upper auger driveshaft 142 and resists forces that would tend to misalign the apparatus by destroying concentricity of driveshafts 80 and 142. Bearing assembly 162 may be mounted atop upper auger plate 147 at the top of upper auger section 64 with a plurality of bolts 165. FIG. 11 also offers an isometric view of retaining bolt 166, washer 168, bushings 161 and 169, compression spring 170, and tapped hole 163 in neck 160 on stabilizer 156.

Figure 12:
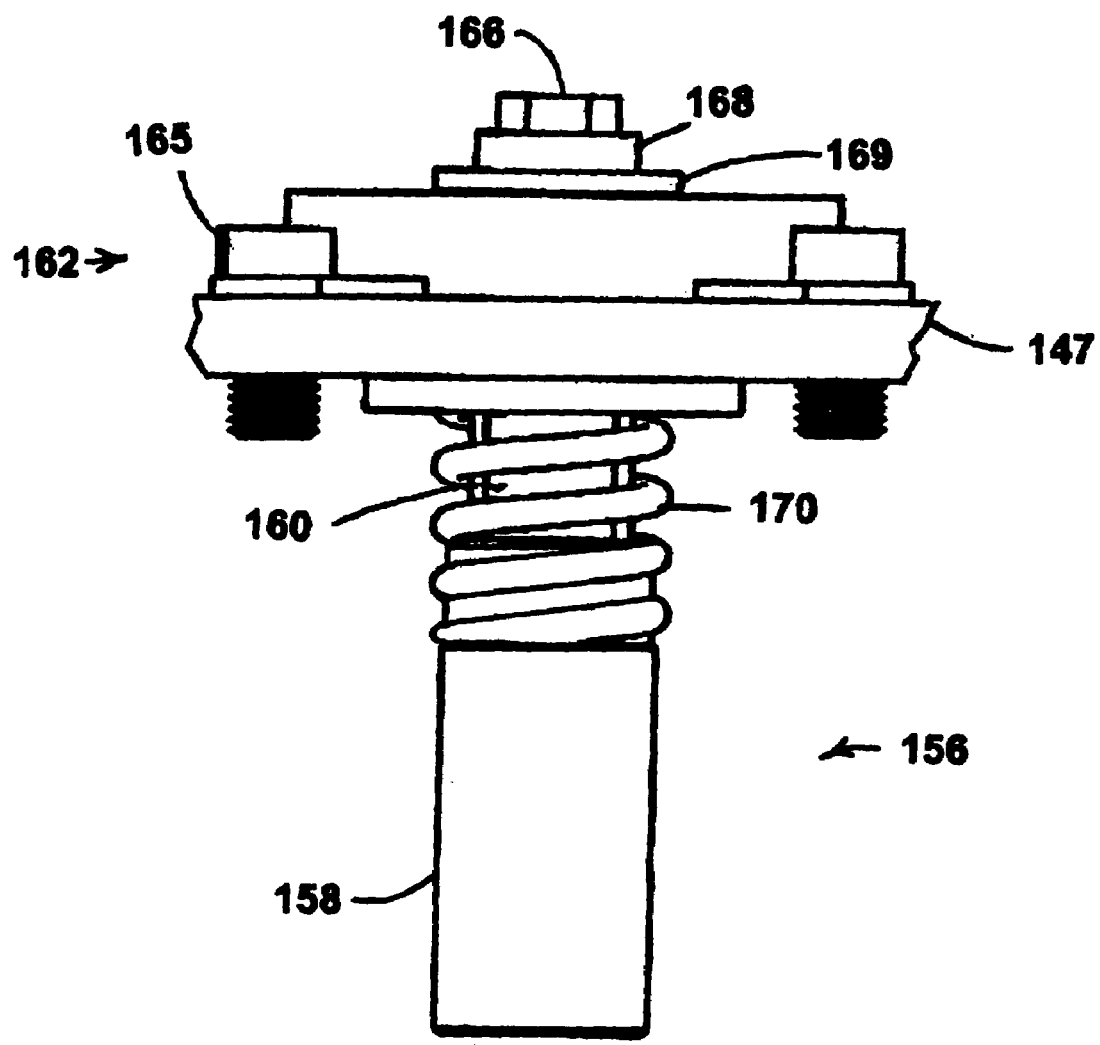
FIG. 12 is an enlarged elevation view of the stabilizer assembly.

FIG. 12 illustrates thrust bearing 162 bolted to upper auger plate 147, and retaining bolt 166 seated in the tapped hole in the end of square neck section 160. Spring 170 is therefore illustrated in a captured and compressed condition.

Figures 13, 14, 15:
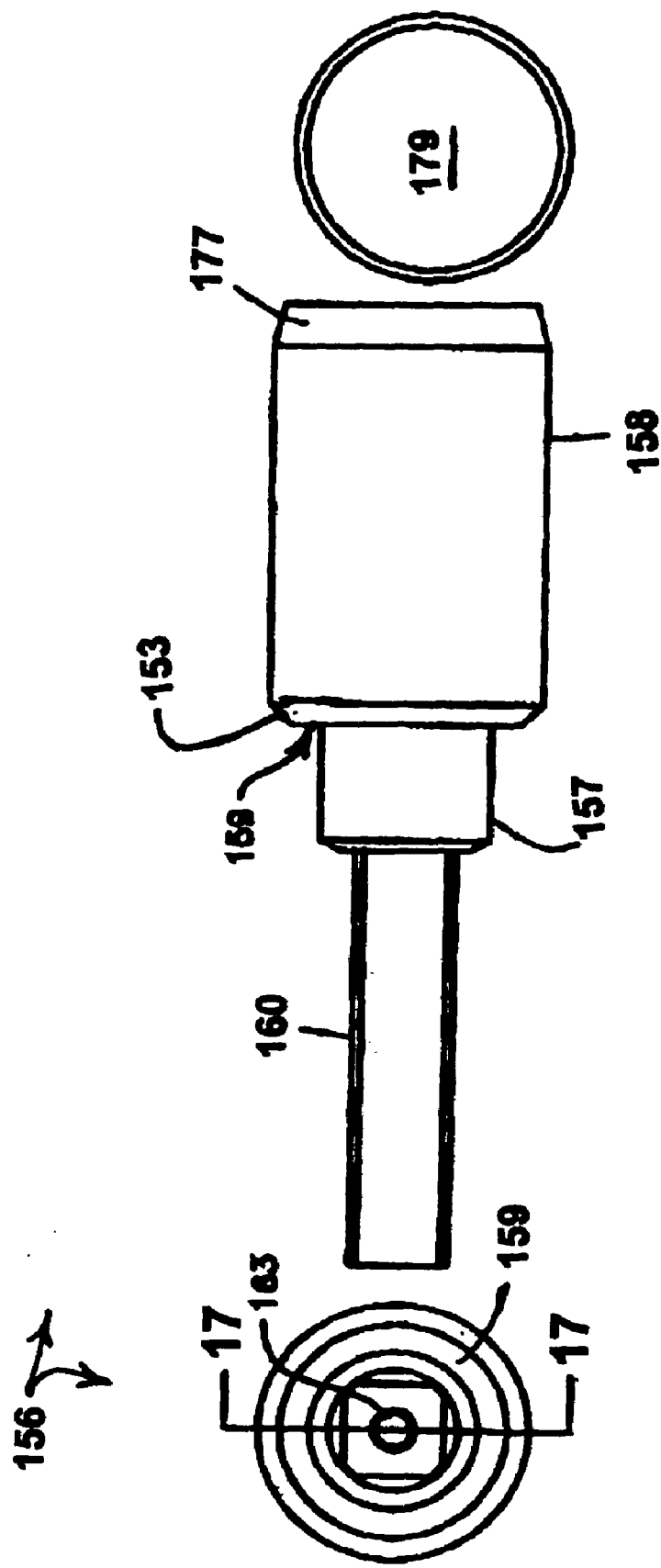
FIG. 13 is an elevation view of the stabilizer assembly.
FIG. 14 is a top plan view of the stabilizer assembly, as viewed from a position to the left of FIG. 13.
FIG. 15 is a bottom plan view of the stabilizer assembly, as viewed from a position to the right of FIG. 13.

FIG. 13 is an elevation view of stabilizer 156.

FIG. 14 is a top plan view of stabilizer 156, as viewed from a position to the left of FIG. 13.

FIG. 15 is a bottom plan view of stabilizer 156, as viewed from a position to the right of FIG. 13. In a preferred embodiment of the present invention, base 158 includes chamfered lower end 177 and flat bottom face 179 for facilitating the mounting and alignment to upper end 150 of driveshaft 142 of upper auger section 64.

Figure 16:
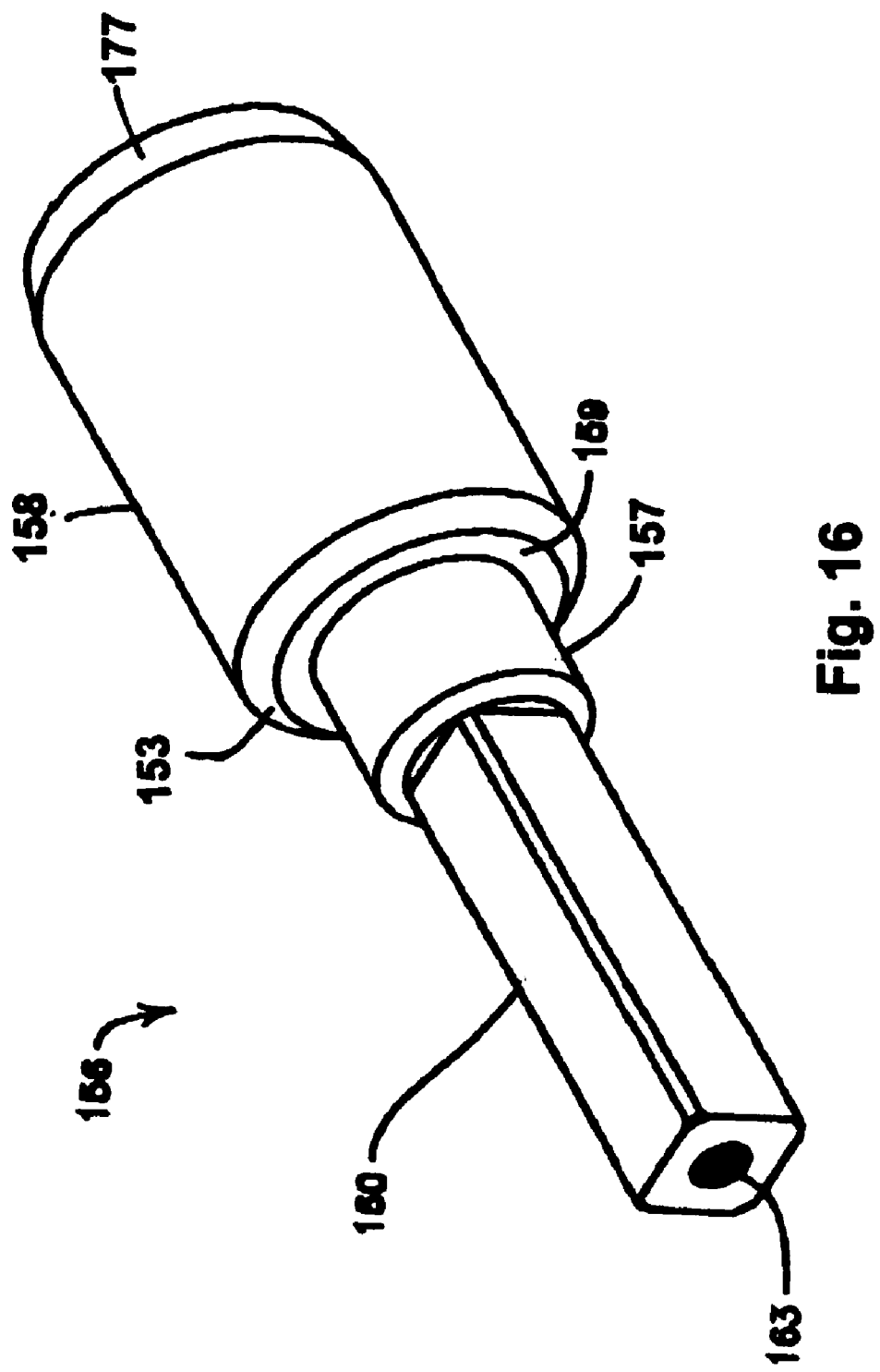
FIG. 16 is an isometric view of the stabilizer assembly.

FIG. 16 is an isometric view of stabilizer 156. Shoulder 159 with a chamfer 153 separates intermediate sections 157 and 158.

FIG. 17 is a sectioned longitudinal isometric view of stabilizer 156.

It will be understood that certain features and subcombinations are utilitarian in and of themselves, and may be employed without reference to other features and subcombinations. Furthermore, while the present invention has been described in terms of one preferred embodiment and a few variations thereof, it will be apparent to those skilled in the art that form and detail modifications may be made to those embodiments without departing from the spirit or scope of the invention.

I claim:

1. An auger assembly comprising:
a first auger housing;
a first driveshaft housed within said first auger housing;
an output driveshaft;
a lower drive assembly configured to operatively couple said output driveshaft to a first end of said first driveshaft;
wherein said lower drive assembly includes a driveshaft support assembly configured to receive said first end of said first driveshaft; wherein said driveshaft support assembly is configured to bear the radial and thrust forces imparted by said first driveshaft; and
further comprising an output driveshaft disengagement assembly coupled to said lower drive assembly and suitable for forcibly disengaging the output shaft from the driveshaft support assembly.

2. The auger assembly of claim 1 further comprising:
a second auger housing foldably coupled to said first auger housing;
a second driveshaft housed within said second auger housing; wherein a first end of said second driveshaft is configured to operatively couple to a second end of said first driveshaft; and
a stabilizer assembly coupled to a second end of said second driveshaft.

3. The auger assembly of claim 2 further comprising: a fighting coupled to said second driveshaft.

4. The auger assembly of claim 2 wherein said second auger housing is tubular shaped.

5. The auger assembly of claim 1 further comprising:
a fighting coupled to said first driveshaft.

6. The auger assembly of claim 1 wherein said first auger housing is tubular shaped.

7. An auger assembly comprising:
a first auger housing;
a first driveshaft housed within said first auger housing;
an output driveshaft;
a lower drive assembly configured to operatively couple said output driveshaft to a first end of said first driveshaft, wherein said lower driver assembly includes a drive collar suitable for receiving a first end of said first driveshaft; and
a driveshaft support assembly coupled to said lower drive assembly and configured to receive a first end of said drive collar;
wherein said first auger housing includes a lower auger plate defining an orifice suitable for receiving said drive collar.

8. The auger assembly of claim 7, wherein said drive collar includes a cylindrical shank having a first diameter and an intermediate cylindrical section having a second diameter, wherein said first diameter is less than or equal to a diameter of said orifice and wherein said second diameter is greater than said diameter of said orifice.

9. The auger assembly of claim 8, wherein said lower drive assembly further includes a circular drive plate defining an opening having a third diameter greater than said diameter of said intermediate cylindrical section and wherein said drive collar includes a cylindrical head having a diameter greater than said third diameter.

10. The auger assembly of claim 9, wherein said circular drive plate is attached to said drive collar with said shank penetrating said orifice.

11. An auger assembly comprising:
a first auger housing;
a first driveshaft housed within said first auger housing; an output driveshaft;
a lower drive assembly configured to operatively couple said output driveshaft to a first end of said first driveshaft;
a second auger housing foldably coupled to said first auger housing;
a second driveshaft housed within said second auger housing; wherein a first end of said second driveshaft is configured to operatively couple to a second end of said first driveshaft; and
a stabilizer assembly within said second auger housing and coupled to a second end of said second driveshaft to maintain a force on said second driveshaft;
wherein the stabilizer assembly includes a compression device coupling an upper plate of said second auger housing to a second end of said second driveshaft;
wherein the compression device comprises a spring;
a stabilizer attached to said second end of said second driveshaft, wherein said stabilizer includes a cylindrical base and a neck section, wherein said cylindrical base is attached to said second end of said second driveshaft;
wherein said neck portion projects through said spring and said spring is compressed between said upper plate of said second auger housing and a surface of said cylindrical base.

12. The auger assembly of claim 11, wherein said stabilizer further includes a cylindrical intermediate section that is concentric with said cylindrical base.

* * * * *